United States Patent [19]

Schneider

[11] Patent Number: 4,684,011
[45] Date of Patent: Aug. 4, 1987

[54] CONVEYOR ROLLERS WITH TRACTION O-RINGS AND CONVEYOR INCLUDING SAME

[75] Inventor: Thomas C. Schneider, Oak Forrest, Ill.

[73] Assignee: Velten & Pulver, Inc., Chicago Ridge, Ill.

[21] Appl. No.: 790,141

[22] Filed: Oct. 22, 1985

[51] Int. Cl.⁴ .............................................. B65G 17/24
[52] U.S. Cl. .................................................... 198/779
[58] Field of Search ................ 198/779, 781, 789–791, 198/780, 824, 843

[56] References Cited

U.S. PATENT DOCUMENTS

| | | | |
|---|---|---|---|
| 714,812 | 12/1902 | Mann et al. | 198/824 |
| 4,003,466 | 1/1977 | Muth et al. | 198/779 |
| 4,030,620 | 6/1977 | Euverard et al. | 198/779 |
| 4,103,769 | 8/1979 | Jorgensen | 198/781 |
| 4,142,624 | 3/1979 | Diver et al. | 198/779 |
| 4,297,121 | 10/1981 | Rhonehouse | 198/790 |

Primary Examiner—Joseph E. Valenza
Attorney, Agent, or Firm—Emrich & Dithmar

[57] ABSTRACT

A roller conveyor includes a belt of parallel free rollers interconnecting endless conveyor chains which move along a conveyor path. At least certain ones of the rollers carry encircling O-rings engageable with traction shoes for effecting rotation of the rollers. A given roller may carry more than one O-ring of different cross-sectional thicknesses, and the roller may be provided with recesses in which the O-rings are seated. The O-rings and traction means can be arranged in various configurations for effecting rotation of different groups of rollers, for effecting rotation in opposite directions, and for effecting rotation at varying speeds.

12 Claims, 4 Drawing Figures

U.S. Patent  Aug. 4, 1987  4,684,011
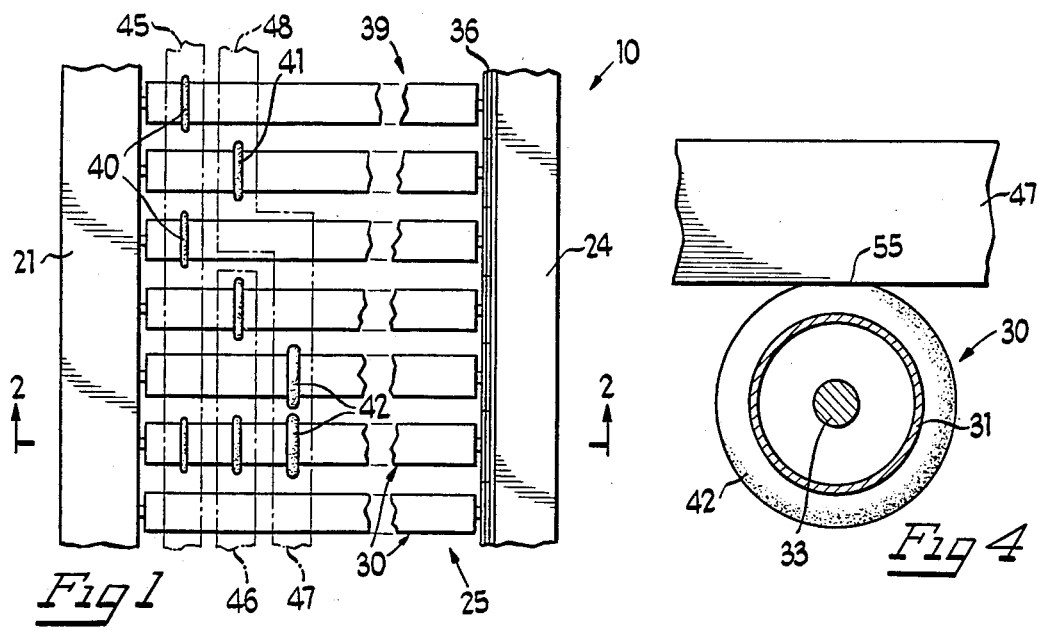
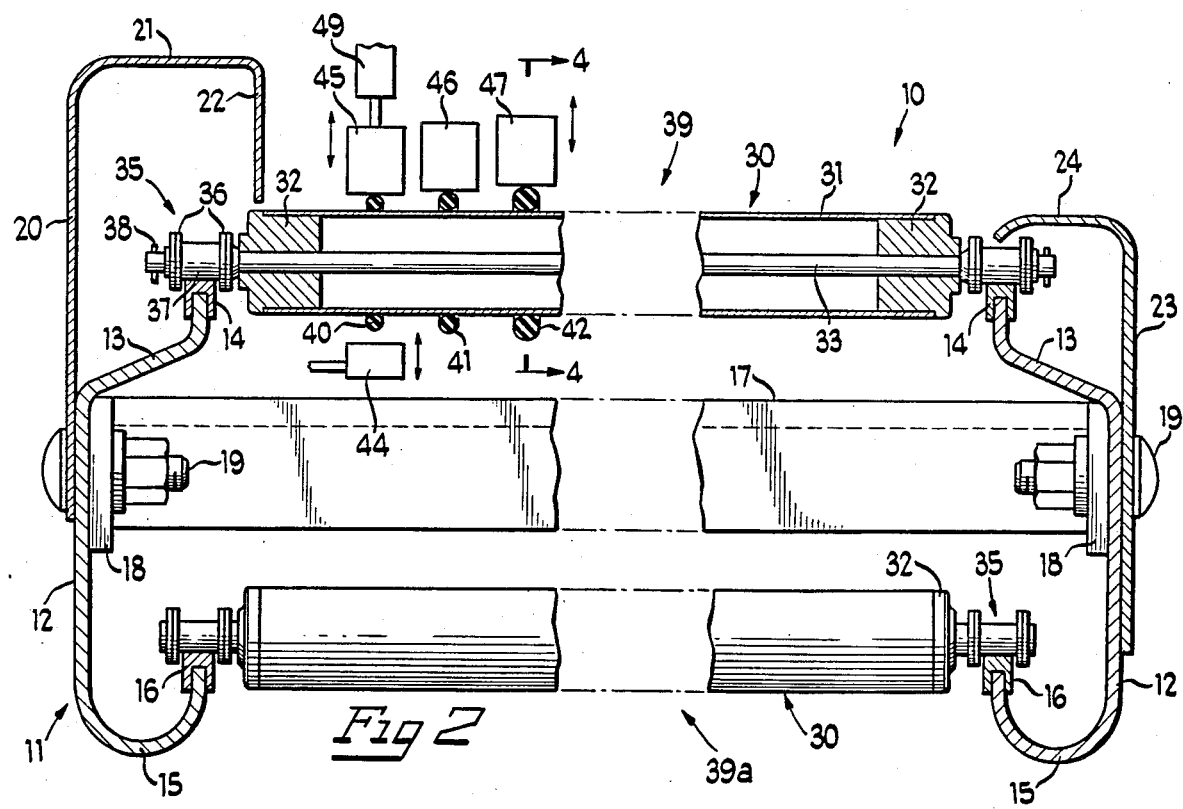
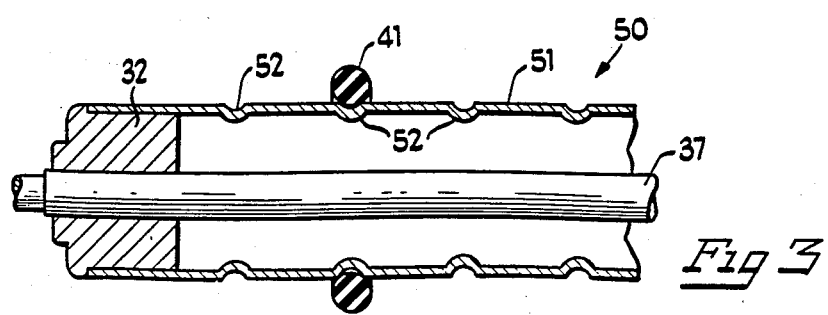

CONVEYOR ROLLERS WITH TRACTION O-RINGS AND CONVEYOR INCLUDING SAME

BACKGROUND OF THE INVENTION

The present invention relates to roller conveyors, and particularly to conveyors of the type which include an endless belt of free rollers interconnecting conveyor chains which are driven along a conveyor path. The invention has particular application to means for effecting rotation of selected ones of the free rollers.

In a roller conveyor it is frequently desirable to effect selective rotation of certain ones of the rollers for various reasons. For example, the rollers along a certain section of the conveyor path may be rotated about their axes in a forward direction so that conveyed articles passing over that section will be accelerated, for the purpose of accumulating spaced-apart articles. Alternatively, rollers in a section of the conveyor path may be rotated in the reverse direction to retard conveyed articles as they pass over that section, such as for the purpose of introducing spaces between conveyed articles.

Typically, this selective rotation of the free rollers is effected by traction means, such as a traction shoe, which is movable into frictional engagement with the surface of the roller. As the conveyor belt moves past the traction shoe, the engagement of the rollers with the traction shoe effects a rotation of the rollers about their axes, the direction of rotation being dependent upon whether the traction shoe is disposed above or beneath the rollers. Such an arrangement is disclosed, for example, in U.S. Pat. No. 4,142,624.

This prior arrangement for effecting roller rotation has a number of drawbacks. First of all, the rollers and the traction shoes must be manufactured to careful tolerances, as must the drive means for the traction shoes, to insure that the traction shoes will be brought into sufficient contact with the rollers to effect rotation thereof, but will not bear against the rollers with excessive force, which can cause undue wear on the rollers and the traction shoes. If the rollers are untrue, or if the axes of adjacent rollers are not coplanar, then the rollers will not be evenly engaged by the traction shoes and skipping and uneven rotation results. Furthermore, frequently the rollers have oil on them which causes the traction shoes to slide on the rollers, thereby adversely affecting proper rotation and tending to increase wear on the rollers and the shoes. The traction shoes must be moved into engagement with the rollers with substantial force in order to allow for these tolerance considerations and, therefore, both the friction shoes and the rollers tend to wear out rather rapidly.

Another drawback of the prior arrangement is that it lacks flexibility. For example, typically, the traction shoe is an elongated member which is adapted to engage a plurality of adjacent rollers. In this arrangement, it is very difficult to selectively omit rollers from rotation. Thus, for example, if it were desired to effect rotation of only alternate rollers in a region of the conveyor path, it would be necessary to use a large number of small shoes, each adapted to engage only a single roller at a time, a complicated and expensive option, or it would be necessary to change the lengths of alternate rollers so that the shorter ones would not engage the traction shoe.

Similarly, in prior arrangements, the speed of rotation of the rollers by the traction shoes is dependent upon the speed of movement of the conveyor belt and cannot be altered unless the belt speed is altered.

SUMMARY OF THE INVENTION

It is general object of the present invention to provide an improved roller conveyor and rollers therefore which avoids the disadvantages of prior conveyors while affording additional structural and operating advantages.

An important object of the invention is the provision of a roller conveyor and traction means therefor which affords more positive and uniform engagement between the rollers and the traction means.

In connection with the foregoing object, it is another object of the invention to provide a roller conveyor of the type set forth, which minimizes wear on the rollers and the traction means.

Still another object of the invention is the provision of a roller conveyor of the type set forth, which is of simple and economical construction, and yet permits selection of individual rollers to be rotated.

It is yet another object of the invention to provide a roller conveyor of the type set forth which permits selective change in the speed of rotation of the rollers without changing the overall speed of the conveyor belt.

In connection with the foregoing objects, it is another object of the invention to provide an improved conveyor roller for use in forming conveyors of the type set forth.

These and other objects of the invention are attained by providing in a roller conveyor including a pair of spaced-apart endless conveyor chains movable along parallel conveyor paths, and a plurality of rollers having axes extending perpendicular to the chains and spaced apart longitudinally thereof with each roller interconnecting the chains and being freely rotatable about its axis, the improvement comprising: a resilient ring extending circumferentially around one of the rollers coaxially therewith in firm engagement therewith, and traction means frictionally engageable with the ring to cause the one roller to rotate about its axis in response to movement of the conveyor chains along the conveyor path.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments, thereof, from an inspection of which, when considered in connection with the following description, the invention, its construction and operation, and many of its advantages should be readily understood and appreciated.

FIG. 1 is a fragmentary, top plan view of a portion of a roller conveyor constructed in accordance with and embodying the features of the present invention;

FIG. 2 is an enlarged, fragmentary view in vertical section taken along the line 2—2 in FIG. 1;

FIG. 3 is a further enlarged fragmentary view in vertical section of a modified form of roller for use on the roller conveyor of FIG. 1; and FIG. 4 is a further enlarged, fragmentary view in vertical section taken along the line 4—4 in FIG. 2.

DESCRIPTION OF THE PREFERRED EMBODIMENTS

Referring to FIGS. 1 and 2, there is illustrated a roller conveyor, generally designated by the numeral 10, constructed in accordance with and embodying the features of the present invention. The roller conveyor 10 includes a main frame 11 which includes a pair of opposed and laterally spaced-apart side frames 12, arranged substantially as mirror images of each other. Each of the side frames 12 includes an angle portion 13 which is inclined upwardly and laterally inwardly toward the other side frame 12 and carries on its upper end of elongated upper rail 14. Each of the side frames 12 also includes an inwardly extending U-shaped bottom portion 15, which carries at its distal edge a lower rail 16. The upper and lower rails 14 and 16 may be formed of a suitable material, such as nylon. The side frames 12 extend longitudinally of the conveyor and are interconnected by a plurality of spaced-apart cross members 17, each having a pair of attachment flanges 18 at its opposite ends fixedly secured, as by bolts 19, to the side frames 12.

The main frame 11 also includes a belt guard plate 20 which is fixedly secured to one of the side frames 12 by the bolts 19 and extends upwardly therefrom, being provided at its upper end with a laterally inwardly extending cover flange 21, which is in turn provided at its inner edge with a depending flange 22. On the opposite side of the conveyor 10, there is provided another guard plate 23 which is similarly attached to the associated side frame 12 and extends upwardly therefrom, being provided at its upper end with a laterally inwardly extending cover flange 24.

The roller conveyor 10 includes a conveyor belt 25 which is made up of a plurality of parallel, spaced-apart rollers 30 interconnecting a pair of laterally spaced-apart, endless conveyor chains 35, which are driven by suitable means (not shown) along a conveyor path. Each of the rollers 30 includes a tubular body 31, secured at its opposite ends to a pair of bearings 32, rotatably receiving therethrough, coaxially with the tubular body 31, an elonagated tie rod 33. The opposite ends of the tie rod 33 project outwardly beyond the adjacent ends of the tubular body 31 for connection to the conveyor chains 36. Each of the chains 35 includes a plurality of inner and outer sets of links 36 with spaced-apart bushings 37 therebetween. Each the tie rods 33 is received through one of the bushings 37 and aligned openings in the inner and outer links 36, being retained in place by a collar 38.

In use, the bushings 37 of the chains 35 along a part of the conveyor path are respectively disposed in sliding engagement with the upper rails 14 to define an upper support flight 39 of the conveyor belt 25, while another portion of the belt 25 has the bushings 37 of the two chains 35 respectively slidably engaged with the lower rails 16 to define a lower or return flight 39a. The upper surfaces of the rollers 30 along the support flight 39 cooperate to define a support plane for conveyed articles (not shown). It can be seen that, in use, the belt guard plate 20 overlies and protects one of the chains 35 along the support flight 39, while the guard plate 23 partially overlies and protects the other chain 35 along the support flight 39.

Each of the rollers 30 carries one or more O-rings thereon, O-rings 40, 41, and 42 of respectively different cross-sectional thicknesses being disclosed. Preferably, each of the O-rings 40-42 is formed of a resilient compressible material, such as rubber or the like, and encircles the associated roller 30 coaxially therewith and in firm frictional engagement with the tubular body 31 thereof. Depending upon the particular application, each of the rollers 30 may have one or more of the different O-rings 40-42 thereon. Preferably, the O-rings 40-42 are arranged in longitudinal rows spaced-apart laterally of the conveyor belt 25. More specifically, all of the O-rings 40 are preferably aligned longitudinally of the conveyor belt 25, while all of the O-rings 41 are similarly aligned, as are all of the O-rings 42.

The roller conveyor 10 also includes traction means for engaging the O-rings 40-42. These traction means can also be arranged in any desired pattern. For purposes of illustration, there is disclosed a lower traction shoe 44 disposed beneath the support flight 39 for engagement with the O-rings 40. There are also provided a group of traction shoes 45, 46 and 47 disposed above the support flight 39, respectively for engagement with the O-rings 40, 41, and 42. Each of the traction shoes 44-47 is provided with associated drive means, such as a drive cylinder 49, to effect selective movement of the drive shoe between a retracted position out of engagement with the associated O-rings (see traction shoe 44 in FIG. 2) and an engaging position disposed in frictional engagement with the associated O-rings (see traction shoes 45-47 in FIG. 2). As can be seen in FIG. 1, it is possible to arrange a traction shoe, such as the traction shoe 47, with an offset portion 48 so that the main portion of the traction shoe 47 engages one set of O-rings, such as the O-rings 42, while the offset portion 48 engages another set of O-rings, such as the O-rings 41.

In operation, it can be seen that the traction shoes 44-47 do not directly engage the surface of the tubular bodies 31 of the rollers 30, but rather engage only the O-rings 40-42. This affords a number of significant advantages. First of all, it prevents the traction shoes 44-47 from contacting any oil which might be present on the rollers 30, thereby avoiding resultant slippage. The resilience and compressibility of the O-rings 40-42 provides a firm positive engagement along a flattened portion 55 thereof with the associated one of the traction shoes 44-47 (see FIG. 4). Furthermore, it will be appreciated that the compressibility of the O-rings 40-42 accommodates a wide range of tolerances in the manufacture of the conveyor belt 25 and the rollers 30 thereof, while still maintaining firm frictional engagement with the associated one of the traction shoes 44-47.

Another significant advantage of the present invention is that it permits easy selection of individual rollers to be rotated. For example, those rollers 30 to be rotated by the traction shoe 45 carry one of the O-rings 40, while those which are not to be rotated do not. Thus, a simple selectivity is afforded with the use of the standard-length roller 30 throughout the conveyor belt 25.

Similarly, it can be seen that the present invention readily provides for changing of speed of rotation of the rollers 30. In the present inventi, three different size O-rings 40-42 are provided. Because these O-rings have different cross-sectional thicknesses, they have different outer diameters. Since the speed of the conveyor belt 25 is constant, it will be appreciated that the larger the outer diameter of the O-ring being engaged by a traction shoe, the slower the angular rotational speed of the associated roller 30. Thus, where a roller 30 carries more than one of the O-rings 40-42, its speed of rotation can be changed by simple selection of which one of the O-rings 40-42 is engaged by an associated shoe 44-47. By use of the traction shoe 47 with offset portion 48, two adjacent sets of rollers can simultaneously be rotated at different speeds by the use of a single traction shoe control This arrangement might be utilized, for example, where a gradual speed up or slow down of the conveyed articles is desired.

While only three different size O-rings have been disclosed, it will be appreciated that any desired number of different size O-rings could be provided. Thus, it is readily apparent that the present invention affords a wide range of flexibility in selection of rollers to be rotated and selection of speeds of rotation.

Referring now to FIG. 3, there is illustrated an alternative form of roller, generally designated by the numeral 50, for use in the roller conveyor of the present invention. The roller 50 is similar to the roller 30, except that it has a tubular body 51 which is provided with a plurality of circumferential grooves or recesses 52 in the outer surface thereof.

Preferably, each of the recesses 52 is part-cylindrical in transverse cross section, and is arranged coaxially with the tubular body 51. In use, the O-rings 40-42 are respectively seated in corresponding ones of the recesses 52 to provide a firmer and more positive positioning of the O-rings 40-42 on the rollers 50 and to inhibit lateral shifting of the O-rings 40-42 on the roller 50.

From the foregoing, it can be seen that there has been provided an improved roller conveyor and rollers therefor which are of simple and economical construction and which afford positive engagement with associated traction means while accommodating a wide range of manufacturing tolerance and easy selection of individual rollers to be rotated and speed of rotation.

I claim:

1. In a roller conveyor including a pair of spaced-apart endless conveyor chains movable along parallel conveyor paths, and a plurality of rollers having axes extending perpendicular to the chains and spaced apart longitudinally thereof with each roller interconnecting said chains and being freely rotatable about its axis, apparatus for controlling the effective conveyor speed without changing the speed of movement of the conveyor chains comprising: a plurality of resilient rings, each of said resilient rings extending circumferentially around an associated one of said rollers coaxially therewith and in firm engagement therewith in positions spaced apart laterally of the conveyor, and a plurality of traction means selectively frictionally engageable with said rings, each of said traction means being positioned for engagement with only a single ring on any one roller to cause the roller associated with each said ring to rotate about its axis in response to movement of the conveyor chains along the conveyor paths.

2. The roller conveyor of claim 1, wherein each of said resilient rings is formed of an elastomeric material.

3. The roller conveyor of claim 1, wherein each of said resilient rings is substantially circular in transverse cross section.

4. The roller conveyor of claim 1, wherein each of said resilient rings is disposed adjacent to one end of the associated roller.

5. The roller conveyor of claim 1, wherein at least one of said traction means includes a first traction member disposed for causing rotation of an associated roller in a first direction, and a second traction member disposed for causing rotation of the associated roller in a second direction.

6. The roller conveyor of claim 1, wherein each of said rings is compressible by the associated traction means.

7. The roller conveyor of claim 1, wherein said plurality of rings are disposed on the same roller.

8. The roller conveyor of claim 7, wherein each of said rings has a cross-sectional thickness which is different from that of others of said rings.

9. The roller conveyor of claim 1, wherein each of said rings has a cross-sectional thickness which is different from that of others of said rings.

10. The roller conveyor of claim 1, wherein said rings are respectively disposed on different rollers.

11. The roller conveyor of claim 10, and further including at least one additional ring disposed on a roller so as to be aligned longitudinally of the conveyor paths with one of said first-mentioned rings, said traction means including a traction member simultaneously engageable with said one of said first mentioned rings and said at least one additional ring.

12. The roller of claim 8, wherein all of said rings have the same shape of cross-sectional outline.

* * * * *